United States Patent
Neway et al.

(10) Patent No.: US 6,243,615 B1
(45) Date of Patent: Jun. 5, 2001

(54) SYSTEM FOR ANALYZING AND IMPROVING PHARMACEUTICAL AND OTHER CAPITAL-INTENSIVE MANUFACTURING PROCESSES

(75) Inventors: Justin O. Neway, Longmont, CO (US); Steven L. Durfee, South Jordan, UT (US); Gretchen L. Jahn, Thornton, CO (US)

(73) Assignee: Aegis Analytical Corporation, Lafayette, CO (US)

( * ) Notice: Subject to any disclaimer, the term of this patent is extended or adjusted under 35 U.S.C. 154(b) by 0 days.

(21) Appl. No.: 09/392,928

(22) Filed: Sep. 9, 1999

(51) Int. Cl.[7] ................................................ G06F 19/00
(52) U.S. Cl. .............................. 700/108; 700/17; 700/51; 700/83; 700/109; 700/110; 705/7; 705/8; 705/11; 707/102; 707/103; 707/104
(58) Field of Search .................................. 700/17, 51, 52, 700/83, 95, 96, 104, 108, 109, 110, 111; 707/102, 103, 104; 705/1, 7, 8–9, 11

(56) References Cited

U.S. PATENT DOCUMENTS

| | | | |
|---|---|---|---|
| 4,527,272 | * | 7/1985 | Reiney .................................... 371/25 |
| 4,855,923 | * | 8/1989 | Fullmer ................................... 700/95 |
| 4,987,528 | * | 1/1991 | O'Brien ................................. 700/83 |
| 5,257,206 | * | 10/1993 | Hanson ................................. 700/108 |
| 5,596,744 | * | 1/1997 | Dao et al. ............................. 700/108 |
| 5,850,339 | * | 12/1998 | Giles ....................................... 700/51 |
| 5,862,054 | * | 1/1999 | Li .......................................... 700/108 |
| 6,018,716 | * | 1/2000 | Denardo et al. .......................... 705/7 |
| 6,108,662 | * | 8/2000 | Hoskins et al. ....................... 707/102 |

* cited by examiner

Primary Examiner—William Grant
Assistant Examiner—Ramesh Patel
(74) Attorney, Agent, or Firm—Holland & Hart LLP

(57) ABSTRACT

A method for displaying a visual process signature for ready visual recognition and communication of otherwise complex manufacturing process information. Process data may be stored in a plurality of data stores, each data store holding a plurality of records containing process data, each record associated with at least one process component. A proxy virtual database is created from copies of records selected from the data stores. Statistical analysis operations are applied to the selected records within the proxy virtual database to identify process components or combinations of process components having a significant effect on characteristics of a product produced as well as the magnitude of that effect. At least three characteristics of the identified process components including the outcome of the statistical analysis operations are selected and visually displayed in a static or animated three-dimensional representation shown on a two-dimensional display. The visual display indicates the directionality and the extent of the selected characteristics of the selected process components in relation to the selected characteristics of the product produced.

23 Claims, 6 Drawing Sheets

SYSTEM FOR ANALYZING AND IMPROVING PHARMACEUTICAL AND OTHER CAPITAL-INTENSIVE MANUFACTURING PROCESSES

BACKGROUND OF THE INVENTION

1. Field of the Invention

The present invention relates, in general, to process control, and, more particularly, to analysis of process data in pharmaceutical and other capital intensive manufacturing processes with batch data distributed across a plurality of disparate databases, to identify and demonstrate interactions of process variables that are likely to strongly affect desired outcomes.

2. Relevant Background

Great effort is expended to control manufacturing processes so as to avoid process parameter combinations that result in unsatisfactory product and to enhance the likelihood of producing superior product. Nowhere is this more true than in the manufacturing of pharmaceuticals, food and food supplements, and health care products and capital intensive manufacturing processes in general. Defective products increase the risk to consumers, increase costs, and waste resources that could otherwise be applied towards making cost-efficient, effective drugs and other products.

There is a class of data analysis problems, frequently encountered in manufacturing, that occurs when a specific sequence or combination of events or process variables causes an undesirable outcome, usually unsatisfactory product. In these situations, it is desirable to find those variables and their ranges of values which, in combination, are associated with the undesirable outcome. Traditional statistical methods are limited in their ability to provide the required information. It would therefore be desirable to have a method which solves these types of data analysis problems and to have software implementing the method in a computer which can be used by process operators, supervisors and engineers.

Principal component regression (PCR) techniques promise a more effective analysis of manufacturing data. PCR analysis has shown high value for focusing attention on those controllable process parameters that have the greatest likelihood of impacting manufacturing by subjecting the process data to a two-step process: Principal Component Analysis (PCA) followed by regression. Most large data sets, such as those produced during pharmaceutical and other capital intensive manufacturing, have properties that prohibit effective modeling using the raw process data. There is usually considerable correlation between the independent variables and there are usually a large number of variables. Using PCA, these attributes are used to advantage. This is done by transforming the data so that the large number of correlated variables are replaced by a much smaller set of uncorrelated variables. The new, smaller set of variables (called "principal components") contains substantially the same information as the larger set of raw data within measurement error.

Traditional statistical software tools are available to apply statistical process control techniques to available process data. Examples include SAS, S-PLUS, StatServer, Statistica, Matlab, Impropmtu, Mathematica and JMP. Several of these packages have good 2D display capabilities for standard trending and bar charts. However, each requires some amount of command line programming to perform PCR and they do not support robust, flexible visualizations. These software packages are generally difficult to learn because they include a comprehensive set of statistical techniques, most of which must be sidestepped to do PCR. They lack sufficiently powerful, flexible and intuitive graphic display capabilities for visual pattern recognition. Most have limited ability to handle the very large data sets that are common in pharmaceutical and other capital intensive manufacturing environments. In summary, they have limitations in their ability to provide useful point-and-click workflows specific to the requirements of pharmaceutical and other capital intensive manufacturers. Moreover, there exists deficiencies in both the front-end and back-end of available methods. In the front end, it is often difficult to access the relevant process data needed to make meaningful statistical analysis. On the back end, tools to format and display the results of statistical analysis in a readily discernible manner are lacking.

Access to relevant process data is impeded because process data is gathered and stored in a variety of disparate data storage systems. Hardware systems for gathering and storing data have become increasingly less expensive and more widely available in recent years. A very large number of measurement systems are installed in manufacturing companies gathering and storing vast amounts of raw batch data. These raw data have little utility on their own, yet can be a strategic asset for manufacturing process improvement, trouble-shooting and control. The value of this data can only be realized once the information content is extracted and used for decision-making. This is a widespread problem in the pharmaceutical industry. The lack of a well integrated data analysis and visualization software system easily usable by non-programmer scientific professionals is hampering the ability to extract information from their manufacturing data. There is a need for systems to assist with lost batch avoidance, process improvement, trouble-shooting and technology transfer.

Process data is often stored in legacy systems as well as modern database architectures. The process data is often distributed across a variety of hardware, sometimes at a variety of geographical locations. In practice, an analyst wishing to gather a particular set of data must request the data from the variety of sources, condition, reformat, import and export the data in a manner that is compatible with the analysis tools. These processes delay the analysis process and limit the variety of analyses that can be employed. Unfortunately, relevant data is often not included in the analysis because of the difficulty and delay in obtaining the data.

On the back end, the statistical analysis tools often provide only a raw numeric output or at best two-dimensional and sometimes three-dimensional representations of various process parameters. These static representations of the statistical analysis are useful, but limit the ability of the analyst to detect and demonstrate the process interactions that affect the product outcome. Particularly in regulated industries such as pharmaceutical, food, and food supplement industries a need exists to demonstrate the process control techniques used and the results provided by statistical process control. A need also exists for process analysis tools that enable an analyst to readily access relevant process data and visualize the results of statistical analyses.

There are some very capable three dimensional and four dimensional graphics applications available on the market, for example PV-WAVE and Advanced Visual Systems (AVS). These graphics applications are competent at quickly drawing a wide range of sophisticated displays, and they can handle the large data sets common in pharmaceutical manufacturing. However, they either lack the range of needed statistical capabilities and/or they have steep learning curves for either command line programming in the case of PV-WAVE, or object configuration in the case of AVS.

Regulated industries have unique needs for retrospective batch process data analysis, demanding powerful capabilities for statistical analysis, pattern recognition and data visualization that are not being satisfied by currently available systems. These industries need continuous process improvement as well as the ability to accomplish process equivalence demonstrations, demonstrations related to product lot release, and product specification failure avoidance.

SUMMARY OF THE INVENTION

Briefly stated, the present invention involves a method and system for displaying a process signature for ready visual recognition and communication of process data. Process data is stored in a plurality of data stores, each data store holding a plurality of records containing process data, each record associated with at least one process component. A proxy virtual database is created from records selected from the data stores. Statistical analysis operations are applied to the selected records within the proxy virtual database to identify process components and combinations of process components having a significant effect on characteristics of a product produced. At least three characteristics of the identified process components are visually displayed in an animated three-dimensional representation displayed on a two-dimensional display, the visual display indicating directionality and extent of the characteristics of the selected process components in relation to the selected characteristics of the product produced.

DETAILED DESCRIPTION OF THE PREFERRED EMBODIMENTS

A manufacturing process comprises a complex sequence of process components where these components include materials used in the process and operations performed on the materials. The process components also include the machines and tools used to perform, monitor, and control the operations. The operations transform raw materials into intermediate materials and intermediate materials into finished goods.

The present invention is directed to a system that enables manufacturers to improve their process economics, postpone new plant construction through yield improvement, reduce the number of lost batches, speed up technology transfer and time to revenue, and shorten finished product release times. It addresses the critical need for an enterprise-wide, integrated data access, analysis and visualization software system, easily usable by non-programmer manufacturing professionals. The present invention integrates statistics, graphics and report writing with middleware to access data sources scattered across an enterprise. The present invention is implemented as a system that enables point and click access to disparate data sources distributed throughout an enterprise as well as point-and-click mechanisms to visualize analyzed data to discover key factors affecting process outcome.

A key feature of the system for identifying and communicating informative relationships within process data sets is pattern recognition. The patterns are relationships between the measured process variables and the process outcomes during actual operation. The goal is to produce analysis results that direct actions for better process control in the future. This reduces variability in process outcomes and allows process yields to be biased to the more favorable side of their range. These tools can also be used to reverse adverse process drift, improve product quality, and demonstrate process stability and regulatory compliance. All of these results help to speed new drugs to market and reduce their production cost by minimizing specification failures, assisting technology transfer and scale-up, and stabilizing the manufacturing process.

Two important objectives are deriving useful information about how the process really works, and communicating it to others. To achieve these objectives, four closely integrated capabilities are used by the present invention. These are data access, conditioning, analysis and visualization. The first and last of these, and the integration of all of them, are inadequately addressed in current solutions.

Figure 1:
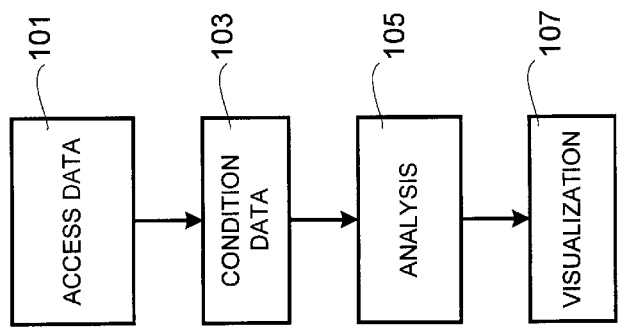
FIG. 1 illustrates a flow diagram including important steps in a process in accordance with the present invention.

FIG. 1 illustrates at a high level of abstraction processes in accordance with the present invention. Essentially, a complete process data solution includes the steps of accessing data (101), conditioning the accessed data (103), analysis (105), and visualization of the analysis results (107). These steps, described in greater detail below, are performed repeatedly to analyze retrospectively the manufacturing process data, identify trends that affect outcomes, and demonstrate product quality and process capability.

A manufacturing process actually generates two products: the manufactured material itself, and the associated process data. As used herein, the term "process data" includes data and metadata representing process components and process results. Hardware systems for gathering and storing raw process data have become increasingly less expensive and more widespread in recent years. Process development and manufacturing equipment now routinely come equipped with their own instrumentation, control systems, and database capabilities. Because of increasingly lower costs, these systems now gather and store large amounts of raw data on a routine basis with every batch of product made.

Figure 2:
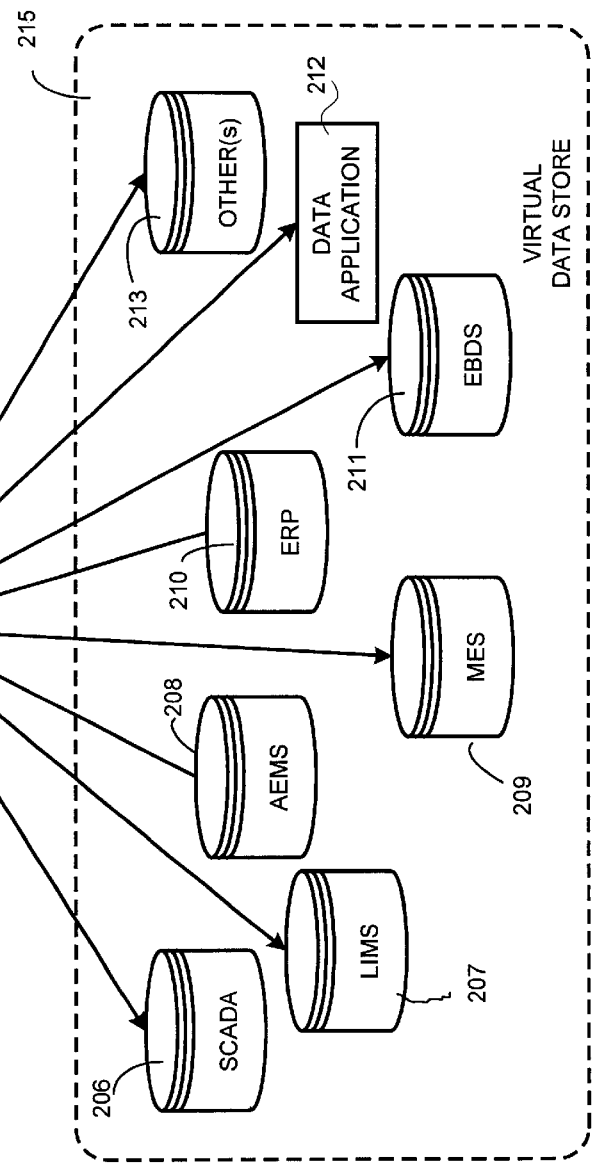
FIG. 2 shows in block diagram form a system implemented in accordance with the present invention.

FIG. 2 illustrates a basic architecture for a data access tool useful in the practice of the present invention. Analysis application 201 provides a user interface including both graphical user interface (GUI). Analysis application 201 may include a number of statistical analysis components, including third party software packages, for providing various analysis capabilities described hereinbelow. Analysis application 201 also implements an interface to a virtual database engine 202.

Virtual database engine 202 is integrated into or provided as a separate component from analysis application 201. Several commercial database applications provide basic functionality for establishing and maintaining connections with a variety of data gathering technologies as well as providing database management tools to retrieve information from the data stores. Virtual database engine 202 includes adapters 203, often provided as plug-in modules, that support connectivity to a particular database. Virtual database engine 202 receives requests and control information from analysis application 201 and generates data store-specific connection requests and queries.

Virtual data store 215 comprises any number of physical data stores. Physical data stores may be geographically remote from the computer implementing analysis application 201. Physical data stores may be implemented using any available data store technology including flat file storage, structured query language (SQL), object oriented query language (OOQL) and the like. Virtual database engine 202 includes sufficient knowledge about the type of database management system and schema of each physical data stores to access and retrieve data from the physical data stores.

Example data stores include, but are not limited to, Supervisory Control and Data Acquisition (SCADA) data store 206 often used to monitor instruments and to control process parameters used by manufacturing equipment. A Laboratory Information Management System (LIMS) database 207 is used to store the data on how well the intermediate and final product met specifications. Product performance in the field is also important and these data are often stored in Adverse Event Management System (AEMS) 208 and other similar databases. Data on the raw materials, reagents and lot numbers used in a batch are stored in the Manufacturing Execution System (MES) 209 or the Enterprise Resources Planning (ERP) 210 system. Other process data sources often have their own specialized databases using Oracle, Sybase, Access, Excel and other database management software. There are also paper records to be dealt with for some of the process data until the transition to Electronic Batch Record Systems (EBRS) Ls complete. These other sources 213 may be accessed directly or through a data application 212 that provides an interface compatible with an adapter 203 but accesses other remote data stores. It is not unusual to find five or more islands of production data relating to a single product batch scattered throughout an enterprise.

All the manufacturing-related databases are usually connected to a corporate network such as a local area network (LAN), wide area network (WAN), or public networks such as the Internet or similar data transport network. The integration of the user interface implemented by analysis application 201 with the corporate network enables point-and-click access to individual databases and to subsets of the data within them. A traditional approach that assembles all the data from separate databases and abstracts the data into a single data warehouse can be very costly. It is also cumbersome to implement, maintain and use because of the complexity of synchronization issues. In the pharmaceutical industry, such a solution can also be in conflict with FDA mandated change control requirements and constraints on the introduction and propagation of errors.

In accordance with the present invention, virtual database engine 202 accesses data from the several physical data stores to create a user selected virtual data store 215 that contains copies (not originals) of selected data records from the several physical data stores. These copied records, or proxies, form the virtual data store in a cost efficient manner. Analysis work, data conditioning, and the like work on the proxy records rather than the originals. Hence, the integrity of the original data records is not compromised. Moreover, the virtual database is much smaller than a raw recreation of the several physical databases and so allows much smaller and more efficient hardware and software to be used.

Once the manufacturing data are deposited in their original respective physical data stores, they remain largely unaltered because of the change control protection required by the FDA. Unfortunately, any errors that may have been present in the original data from both equipment malfunctions and human data entry tend to remain in those databases. Therefore, it is important to provide mechanisms for users to condition the data (step 103 in FIG. 1) to minimize the impact of bad data.

There are essentially four kinds of "bad" data: missing data from failure to capture particular values; outliers arising from electronic or other random fluctuations; erroneous data arising from malfunctioning instruments or data-handling errors; and corrupted data arising from other error producing processes. Preferably, analysis application 201 and/or virtual database engine 202 include an ability to select amongst several methodologies for minimizing the effects of these kinds of errors. Missing data can be replaced with null values that will be ignored by the analysis method, by values that have similar variability to the remaining data in the set, or by values generated by a selected interpolation function. Outliers can be found and removed for the purposes of calculation by the use of formal outlier rules or visual methods. They can also be replaced by the same methods as those used to handle missing data. Erroneous and other corrupted data are less easy to find unless they show up as outliers. Their identification depends more on the judgement of users. In each case, tracking methods are needed that let users know what data has been conditioned and how. Users must be able to assess the effect on their analyses of the chosen conditioning method. They must also be able to repeat the data conditioning for future analyses without writing the altered data back to the original databases.

Data compression is often applied to continuous data. There are several methods used to compress data before depositing it in databases so that the amount of storage space required is reduced. An example might be where the value of a continuously measured process variable remains unchanged over a period of time. In this case, storage space can be saved by recording no further readings until the new reading is different from its predecessor by some threshold amount. As a result, an additional capability needed for data conditioning is to use a compression reversing protocol to decompress the data so that it is ready for analysis.

The types of statistical analyses used to find informative patterns in the data range from simple summary statistics and regression analysis to more complex pattern recognition methodologies. They encompass traditional statistical process control (SPC) capabilities as well as linear modeling (e.g. ANOVA, MANOVA, etc), numerical analysis (e.g. parameterization, optimization, function fitting, etc.), and latent variable methods (e.g. cluster analysis, principal component analysis, partial lease squares analysis, etc.). Latent variable methods are extremely useful for condensing a large number of process parameters into a few key components whose performance has the greatest effect on process outcomes. The preferred analysis implementation includes a variety of tools, at least including mechanisms for implementing a principal component analysis (PCA) and principal component regression (PCR) workflow described in reference to FIG. 3.

Visualizing the results of an analysis is both a cognitive support tool for the analyst as well as an important capability for demonstrating process performance to individuals who are unfamiliar with the data and/or analysis techniques. Traditional ways of displaying results rely on tables and two-dimensional graphs. With the widespread availability of color displays and printers an additional visual "dimension" has become available. Colors can be used to point out significant features in a display of analysis results. With the increasing availability of high performance graphics software and hardware, practical multi-dimensional display methods can be used. However, command line programming is an obstacle. The present invention makes visualization capabilities available through appropriate workflows with a point-and-click interface.

Seeing the overall performance of a batch, or group of batches, in a single image is a very useful capability. This can be accomplished in accordance with the present invention using a mechanism called "Visual Process Signatures" (VPS). A VPS is a graphical representation of the relationships between key process parameters and process outcomes. A VPS goes further than the batch reports which are often used for routine manufacturing process status reporting. Instead of just showing tables of numbers and panels of graphs, these images can illustrate multiple relationships in the data in a single, informative view that can also be animated. They also provide the possibility of mathematically combining the Visual Process Signatures of different groups of batches to derive a single image that shows the key differences between, for example, the top 10% and the bottom 10% of batches as determined by a specific outcome parameter like yield.

Figure 3:
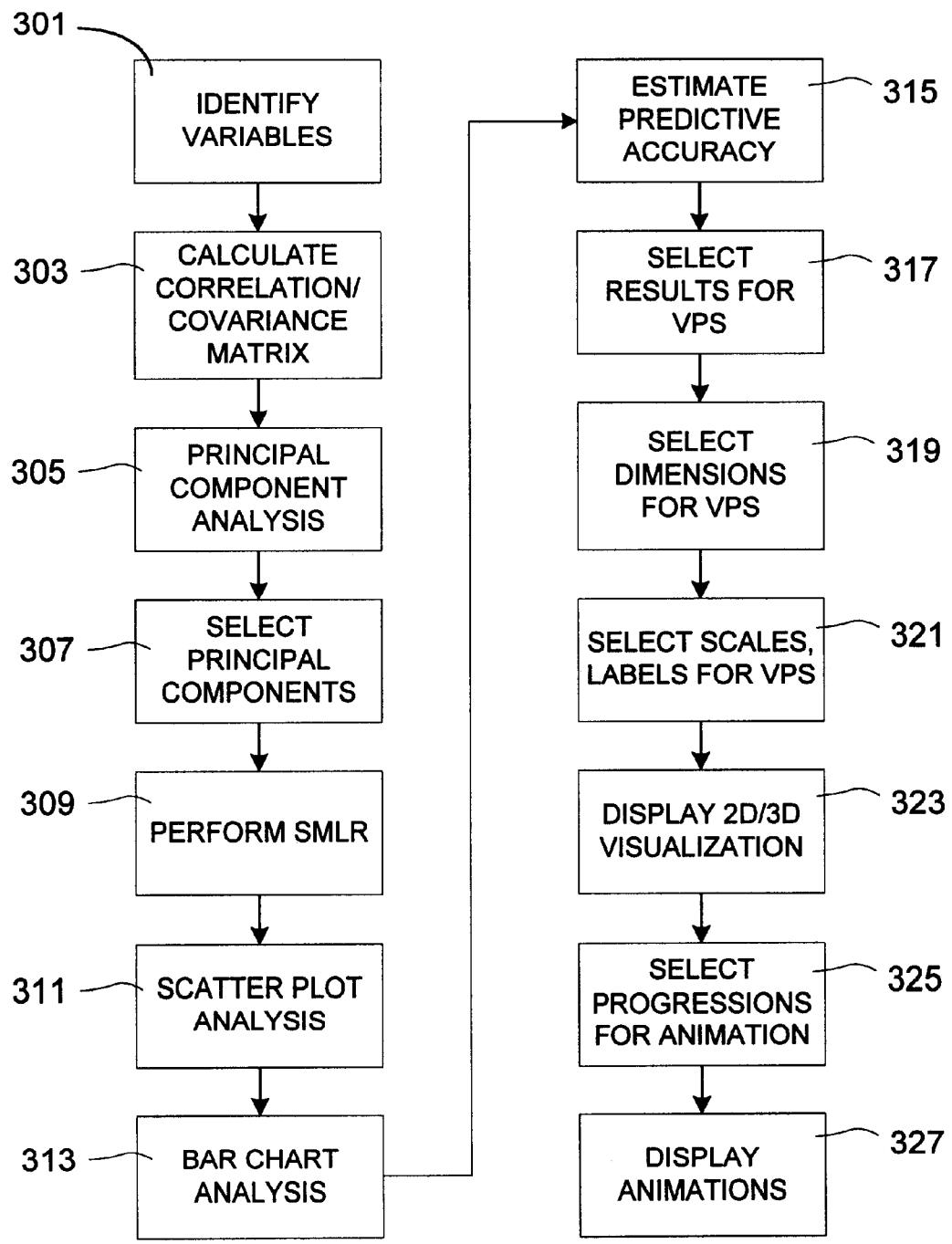
FIG. 3 illustrates a flow diagram of steps in a PCR work flow in accordance with the present invention.

FIG. 3 illustrates a principal component regression workflow in accordance with the preferred implementation of the present invention. Such work flows make the difference between a generic system that forces users to learn the details of the embedded statistics and graphic engines, compared to a truly user-friendly, guided user interface system. The latter makes available the most common analysis methodologies in a sequence of logical steps based on a built-in understanding of what is typical for users. Without this, users spend a large portion of their time figuring out how to use the system and doing manual programming rather than on analysis and interpretation of the results. Furthermore, they lose the power that comes from facile interaction between the data and the analysis and visualization capabilities.

The statistical methods that constitute principal components regression (PCR) consist firstly of principal components analysis (PCA) followed by selection of the most important principal components based on their eigenvalues. Step-wise (SMLR) is then applied. A linear model with a large number of values can often be made to fit any data. Such large models usually have very poor predictive value. To minimize this risk, models derived by PCA and SMLR can be tested by means of Cross Validation. Once the PCR loadings have been derived, it is desirable to illustrate them with informative visual images called Visual Process Signatures (VPS). These techniques in accordance with the present invention are described in more detail in the context of the PCR flow shown in FIG. 3.

In the workflow of FIG. 3 variables of interest, including dependent and independent variables in the process data set, are identified by a user in step 301. Independent variables are those that can be controlled, whereas dependent variables are variables that represent results or outcomes or variables that otherwise cannot be directly controlled. The present invention preferably includes a user interface feature to make the variable selection step 301 an intuitive, "point-and-click" operation.

A correlation/covariance matrix for the identified variables is computed in step 303 as a starting point for principal components analysis. Correlation and covariance are statistical measures of the relatedness of variables.

Most large data sets, such the data gathered during pharmaceutical manufacturing, have properties that work against effective modeling. There is usually considerable correlation between the independent variables and there are usually a large number of variables. In step 305 principal components analysis is used so that these properties can be to advantage. This is done by transforming the data so that the large number of correlated variables are replaced by a much smaller set of uncorrelated variables. The new, smaller set of variables (called "principal components") contains substantially the same information as the larger set of raw data within measurement error.

When PCA step 305 is performed using controllable independent variables, two additional features are produced. The first is a set of "scores" that are a new set of variables describing the information in the original process variables. The second is a set of "loadings" that represent the correlations between the original process variables and the scores. Using PCA, it is often possible to reduce the dimensionality of the data by a factor of two or more. This is because a large portion of the variability in the dependent variables (often more than 90%) can often be accounted for by less than half the number of principal components, i.e. those with the highest eigenvalues.

PCA is one of a class of techniques referred to as "latent variable methods." These techniques have the common property that they produce the basis for a "similarity matrix". In the case of PCA, the similarity matrix is the covariance or correlation matrix, and it is orthogonal. Other types of latent variable methods include discriminant analysis, canonical correlation analysis, and partial least squares (PLS). PCA has advantages because it is relatively easy to interpret, and because it produces results that have desirable statistical properties.

Because the vectors produced by PCA are orthogonal, they are relatively easy to manipulate using matrix algebra and have the advantage that they provide statistically independent variables for multiple regression. By selecting those components with the largest eigenvalues, the dimensionality of the PCA solution can be optimized, retaining the minimum number of variables required to reproduce the original data within experimental error. The preferred embodiments use a correlation matrix in step 303 because its autoscaling pretreatment ensures that the magnitudes and zero points of the raw process variables (which have different units of measurement) do not influence the analysis.

In step 307 principal components having the highest eigenvalues are selected. If the principal components are taken in sequence, then the first principal component is selected so that it is oriented in the direction of maximum variance of the data points. Variance here includes both the error and the meaningful information. The second principal component is selected so that it is orthogonal to the first, but is oriented in the direction of the maximum remaining variance. Third and higher principal components are selected so that they are orthogonal to all of the previous principal components, but align with the maximum remaining variance. The principal components can be ordered first to last, or ranked, by the amount of variance each explains. After doing this, substantially all of the variance in a data set is often found to be described by a small sub-set of principal components.

There are two matrices necessary to account for the results of the PCA performed in steps 305 and 307. One matrix contains the "scores." These are the coordinates of the objects on the principal component axes. If somehow there were a way to measure the scores directly, they would be more useful variables to measure than the original variables because each measures a different feature of the data than any other does because they are orthogonal in data space. The second matrix contains the "loadings." These are the cosines of the angles between the original variable axes and the principal components. The loadings can be thought of as describing how closely related the original variables are to the principal components.

Since the principal components are like variables, they can be submitted to many of the same procedures as other variables, one of which is multiple linear regression in step 309. To do this, a dependent variable (outcome) is selected, and a set of coefficients is calculated that relates the independent variables (principal components) to that dependent variable. For data sets with many variables, it is often not desirable to leave all of the largest principal components in the regression calculation. The reason is that not all of the principal components are actually related to the dependent variable. Yet multiple regression will assign a coefficient regardless, even if the relationship is purely accidental.

Stepwise Multiple Linear Regression (SMLR), the preferred implementation of step 309 is designed to counteract this. SMLR is performed to find the fewest, most significant independent sources of variation and to fit them to the desired process outcome. With this technique, the independent variables are added (or removed) one at a time based on whether they provide a statistically significant improvement in the model. The process stops when the addition or removal of a variable produces no significant improvement. Cross Validation is then used to verify the models predictive capability and to evaluate quantitatively its accuracy.

PCA is one of several available techniques that can be used for retrospective data analysis. There is no single technique hat is necessarily superior to another in developing predictive models from large data sets. The best choice is determined by the data. For this reason, a number of other useful techniques should also be available in a full featured software analysis system in accordance with the present invention.

PCA is particularly useful for analysis of pharmaceutical manufacturing data because PCA is a linear model (non-linear models are often needlessly more complex), it is relatively easy to interpret, it offers straightforward ways of evaluating the coefficients of the model, it can be expected to produce nearly the same model each time using nearly the same inputs, it can develop optimum models even with multiple correlated dependent variables, and it will unambiguously report bad results when it produces a poor model. PCA has the disadvantage that it offers the temptation to produce overfitted models. This is why the preferred embodiment work flow includes SMLR to yield PCR. PCA also does not deal well with nonlinear, discontinuous or other complex sorts of problems or with variability in the dependent variable.

In step 311 Scatter plots are generated and examined to identify unusual samples (e.g., outliers) and unusual structures or features of the plotted data. Two variables can be rendered in Cartesian coordinates by means of a two dimensional "scattergram" generated in step 311. The two dimensions in this rendering are orthogonal (at right angles to the other). By plotting a straight line between the points any simple linear relationship between the two variables is readily modeled. In step 313 bar charts are prepared to show the directionality and extent of correlation between the process variables and the process outcome (i.e. the PCR loadings).

In step 315, multiple regression with cross validation is used to estimate the PCR model's predictive accuracy. Because of the process used to select principal components by means of SMLP, there may be some doubt as to whether the model it yields has useful predictive value. Cross validation is a direct way to address this concern by ensuring that statistically misleading operations have not been accidentally performed that would make the model less effective. It is a simple process for gaining confidence that the model will stand up to the task of predicting unknowns. It assumes that the independent and dependent variables span the same range of values that will be encountered in the future, which is a general limitation of any model.

Cross validation is performed by leaving out the values from one data set (e.g., one manufactured batch) at a time, and then calculating a linear model using values from the remaining batches. This model results in predicting the "unknown", i.e. the manufacturing batch left out of the calculation. This process is repeated until each data set has been left out once. This information can be used to examine the stability of the regression coefficients and to identify outliers. The cross validation predictions can be compared to the actual values of the process outcome to determine a correlation coefficient which provides a measure of confidence in the validity of the model. The independent variables used in the cross validation step 315 are the principal components determined by means of SMLR.

Steps 319 through 327 represent various aspects of generating and displaying visual process signatures (VPS). VPS are graphical representations of the relationships between key process parameters and the process outcomes. A VPS is created from selected groups of discrete data derived from continuous data, by selecting at least three characteristics of the group of process parameters and visually displaying the selected characteristics in a three-dimensional, single frame or animated representation.

A choice of what to display in a VPS is made by the user in step 317 and depends on the specifics of the particular manufacturing process. The loadings determined in PCA analysis step 305 identify process variables that affect outcomes and are used in steps 319 to select dimensions for the VPS. Dimensions are selected for x-axis, y-axis and z-axis. The characteristics of each parameter that determine its position on either the x-axis or the y-axis of a VPS are its parameter value or its position between its minimum and maximum expressed either directly or as a percentage (range scaled). Preferably the user also has an option of positioning each parameter on this axis by its deviation or variation from its mean or median either shown directly or as a function of the number of standard deviations or variances from its group or overall mean, preferably in an auto-scaled or variance-scaled manner, with the mean in the center of the axis (i.e., mean centered).

The characteristic of each process parameter that determines its position on whichever of the x-axis or y-axis of a VPS that has not yet been determined is its parameter name or its parameter name converted to a number or other brief text for display purposes. This number can be used to conveniently indicate the position of the particular parameter in the process order.

The characteristic of each group of process parameters that determines its position on the z-axis of a VPS can be chosen from but is not limited to the following: group mean, group range, group standard deviation, group relative standard deviation, group variance, group maximum, group minimum, group principal component regression loading, group correlation coefficient, and "P" value.

Figure 4:
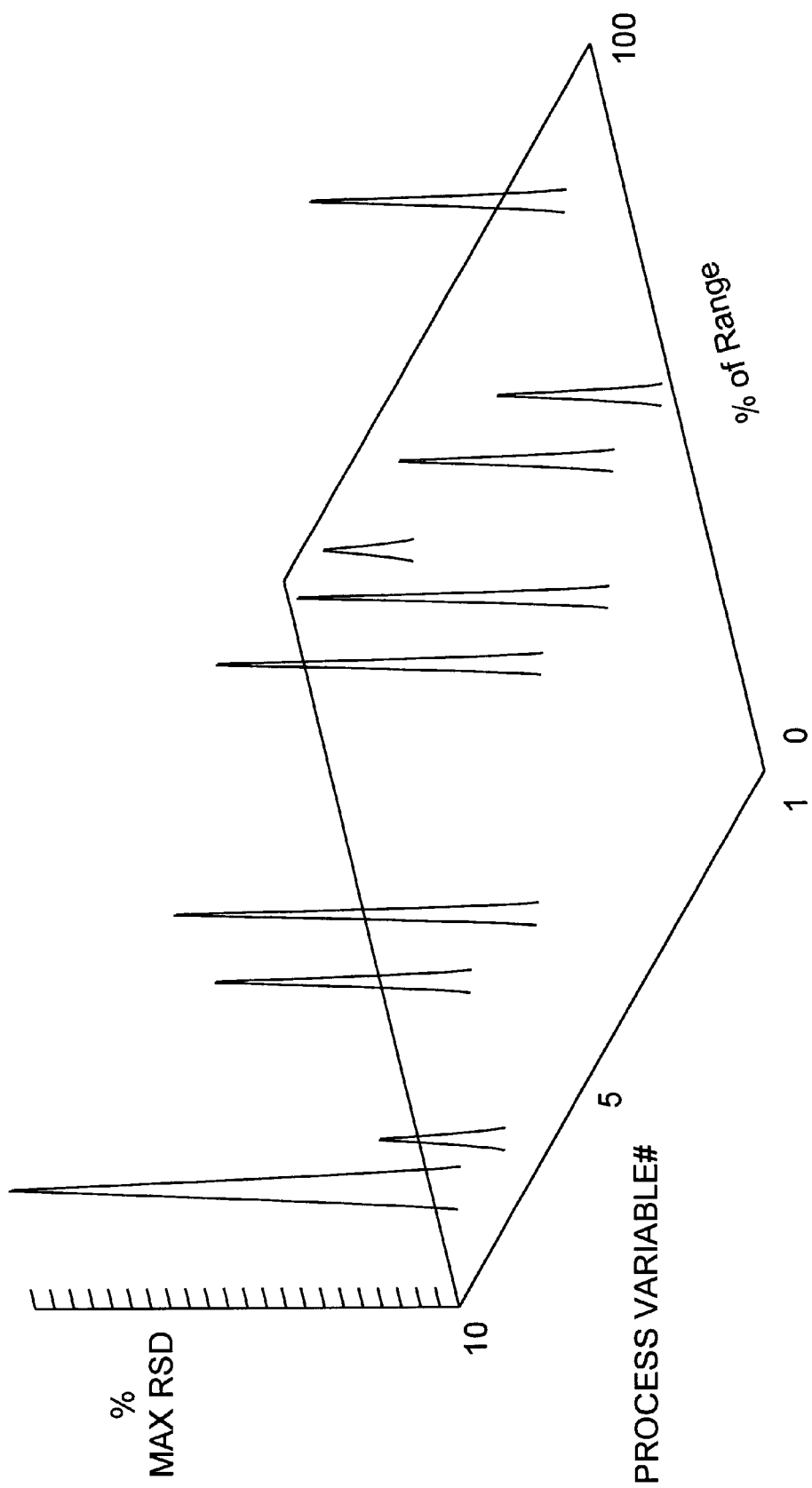
FIG. 4 and FIG. 5 show exemplary 3-dimensional representation of a process control signature generated to demonstrate process variable performance.
Figure 5:
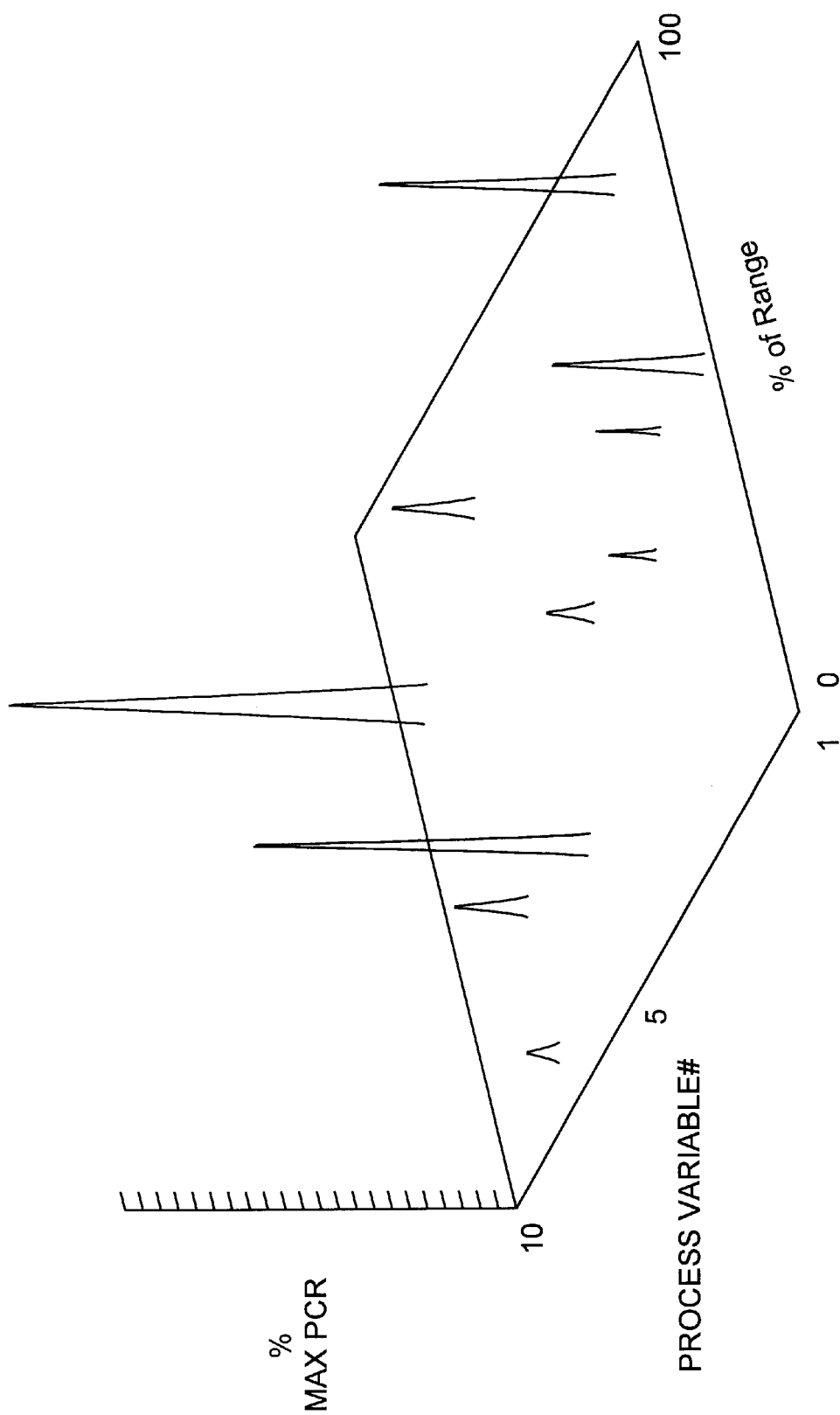

As a particular example shown in FIG. 4 and FIG. 5 an x-axis is chosen to indicate a position in range between minimum and maximum for each variable as a percentage, and the y-axis indicates a listing of process variables in process order. In FIG. 4 the z-axis represents a percentage of the maximum standard deviation (RSD). Hence, the higher the peak in FIG. 4, the greater the variation that was demonstrated by the corresponding process variable within that group of batches. In FIG. 5 the z-axis is chosen to show percentage of maximum PCR loading. Accordingly, the higher the peak in FIG. 5, the greater the contribution of the corresponding process variable to the process outcome. In both the examples of FIG. 4 and FIG. 5 the variable #10 represents the outcome and can be normalized to full-scale output on the z-axis to aid visualization.

By thus displaying the parameters multidimensionally, the invention presents a "high information content snapshot" of a group of batches, allowing the user to make statistical comparisons between batches and manipulate the data. Preferably the 3D plots shown in FIG. 4 and FIG. 5 can be rotated, viewed at different angles, profiled and otherwise manipulated to ease viewing and understanding of the content. Although FIG. 4 and FIG. 5 use only 10 process variables to ease illustration, it is contemplated that tens, perhaps hundreds of process variables can be combined in a single chart to enable the user to visualize interactions amongst the variables.

Figure 7:
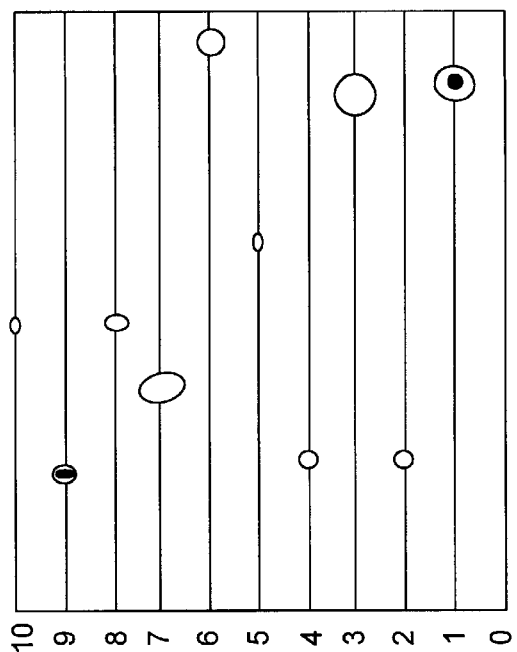
FIG. 6 and FIG. 7 show alternate 2-dimensional representations of a process control signature used to demonstrate process variable performance.
Figure 6:
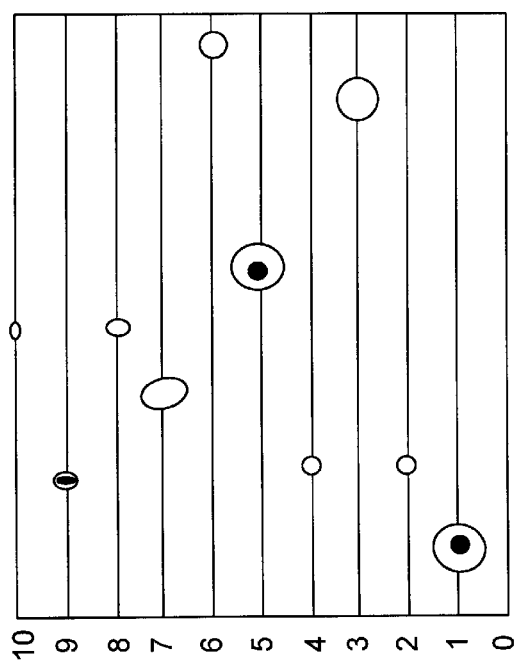

FIG. 6 and FIG. 7 show two-dimensional representations of the visual process signatures over a number batches by using color (indicated by solid regions) to signify the magnitude of the PCR loading. The area covered by the graphic indicator indicates the magnitude of the PCR loading for the corresponding process variable. FIG. 6 shows an example taken over a group of batches with poor performance (indicated by the performance-indicating variable (#10) having a value in the lower percent of its range) whereas FIG. 7 shows a group of batches having superior performance (indicated by the performance-indicating variable (#10) having a value in the higher percent of its range).

Once a VPS has been prepared, the historical performance of the manufacturing process can be shown as a rolling average VPS for a group of batches. This can be done for the complete set of process variables, or for a selected sub-set of process variables of most interest such as those with the highest PCR loadings. By comparing data from multiple batches, the user can identify repeating patterns over time or some other useful ordering.

The present invention takes multidimensional data representation a step further and creates an animated image of a rolling average in steps 325 and 327 of several groups of batches over the course of a manufacturing campaign. As suggested in FIG. 8, a plurality of images are compiled in frames 801a–801e, each image representing, for example, a particular group of batches in a particular sequence. Each frame in the animation is the next group of batches in the sequence. Frames 801a–801e are displayed in sequence, including forward, reverse, stop-motion and single frame. This enables a user to watch, over process history, what is changing in the batch process signature, the relative standard deviations that represents variability in the process parameter group means and the principal components that are most affecting outcomes.

Figure 8:
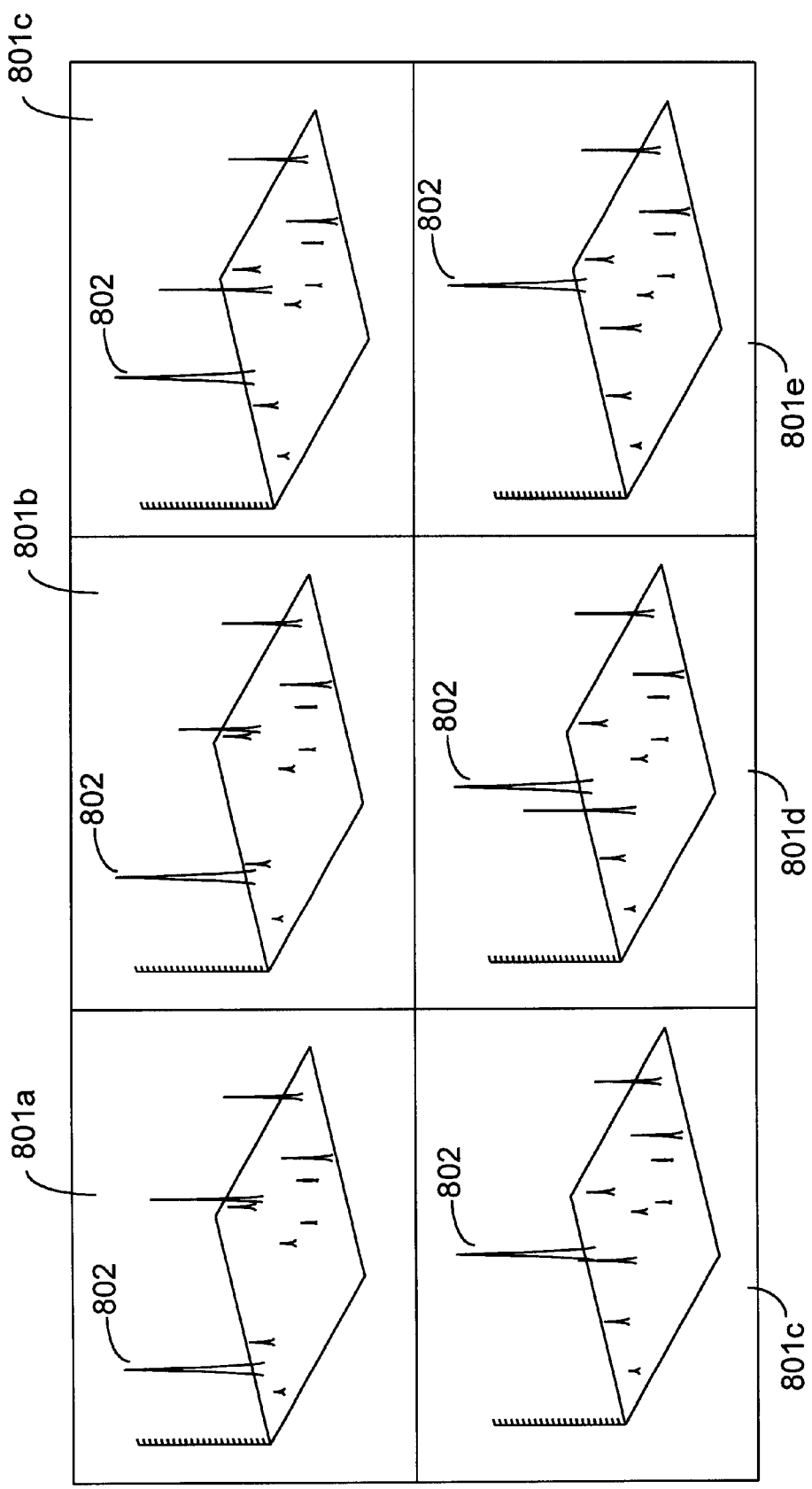
FIG. 8 illustrates a Visual Process Signature animation feature in accordance with the present invention.

An animated visual process signature has the capability of displaying successive frames of a moving average, weighted moving average, moving range, moving standard deviation, or moving variance. The display of such frames is performed in an order determined for example by ranking one of the parameters being displayed in the VPS. The parameter used for this ranking is preferably marked in a different color or by some other means to distinguish it from the rest of the parameters in the frame. In the example of FIG. 8, peak 802 represents the process outcome variable that is to be optimized. Frames 801a–801e are arranged in order of progressively increasing performance of the outcome variable 802. In this order, the frame-by-frame animated display will indicate visual trends between the many lesser peaks as they move about through the course of the display.

Desirably, users also have an option of ordering the frames in an animation by date, from earliest to latest or vise versa. The system also desirably allows the user to animate a VPS by displaying successive frames ordered as a moving average, weighted moving average, moving range, moving standard deviation, or moving variance displayed in an order determined by ranking the difference between the best and worst performance of a selected process parameter. The parameter selected for this difference ranking is desirably marked in a different color or by some other means to distinguish it from the rest of the parameters in the frame. This ranking may be either from the smallest difference to the largest difference or vise versa.

Desirably, a profiling tool is provided that has the capability of selecting a "slice" of a VPS through either the x-axis, y-axis or z-axis and displaying the resulting 2D profile in a different window. This new window can display the full parameter name of the original data and the location of the profile in the VPS. This new profile plot forms a profile of the process parameters that it intersects.

The VPS animated by ranking the date of manufacture allows the user to see the effects on the process of factors that vary singly or together over time, such as, for example, process parameters that are affected by seasonal changes, which can introduce variation in the mineral content of the water or in the humidity of the air. Another useful application of this multidimensional image animation technique is to observe, simultaneously, the changes in all the process parameters as a progression from the worst-performing batches to the best-performing batches. This lets the user literally "see" the key differences between bad and good runs.

Retrospective batch data analysis is a common practice in the pharmaceutical and other manufacturing industries for assessing and improving manufacturing process performance. Many analysts currently consider the PCR work flow described above to be difficult to perform using existing software packages. This is not because the mathematics is novel, but because the available software packages for performing the analysis most often require command line programming rather than point-and-click operation. The various analysis steps are typically not presented in a useful arrangement appropriate for manufacturing data analysis. The present invention provides an integrated solution enabling point-and-click gathering, analysis and manipulation of process data.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A system for analyzing manufacturing process data to identify manufacturing process components affecting characteristics of a product produced by a manufacturing process, the system comprising:
a plurality of data stores holding a plurality of records containing process data, each record associated with at least one of the process components;
a virtual database engine coupled to the plurality of data stores;
a user interface enabling a user to select records from within the data stores;
a proxy virtual database created by the virtual database engine, the proxy database comprising copies of the selected records;
a statistical analysis engine operatively coupled to the proxy virtual database to apply statistical analysis operations to the selected records within the proxy database and identify process components or combinations of process components having a significant effect on the characteristics of the product produced;
a first graphical interface component displaying a two-dimensional relationship between process components or groups of process components and characteristics of the product produced indicating directionality and extent of correlation between the identified process components and the characteristics of the product produced; and
a second graphical interface component enabling display of at least three dimensional relationships indicating directionality and extent of correlation between the identified process components and the characteristics of the product produced.

2. The system of claim 1 wherein one of the first and second graphical interfaces are animated.

3. The system of claim 2 wherein the animation comprises displaying frames ordered by the magnitude of a group of process outcomes.

4. The system of claim 2 wherein the animation comprises displaying frames ordered by the magnitude of a group of selected process components.

5. The system of claim 2 wherein the animation comprises displaying frames ordered by date of manufacture.

6. The system of claim 2 wherein the animation comprises displaying frames ordered by batch number.

7. The system of claim 2 wherein the animation comprises displaying frames ordered by lot number.

8. A method for displaying a visual process signature for ready visual recognition and communication of process data, the method comprising the steps of:
storing process data in a plurality of data stores, each data store holding a plurality of records containing process data, each record associated with at least one process component;
selecting records from within the plurality of data stores;
creating a proxy virtual database comprising copies of the selected records;
applying statistical analysis operations to the selected records within the proxy virtual database to identify process components or combinations of components having a significant effect on characteristics of a product produced,
selecting at least three characteristics of the identified process components; and
visually displaying process data associated with the three selected characteristics in a three-dimensional representation displayed on a two-dimensional display, the visual display indicating directionality and extent of the characteristics of the selected process components in relation to the selected characteristics of the product produced.

9. The method of claim 8 wherein the visual process signature is animated.

10. The method of claim 9 wherein the animation comprises displaying frames ordered in a manner selected from the group consisting of: a moving average, a weighted moving average, a moving range, a moving standard deviation, and a moving variance, each ordered by the magnitude of a group of process outcomes.

11. The method of claim 9 wherein the animation comprises displaying frames ordered in a manner selected from the group consisting of: a moving average, a weighted moving average, a moving range, a moving standard deviation, and a moving variance, each ordered by the magnitude of a group of process components.

12. The method of claim 9 wherein the animation comprises displaying frames in a manner selected from the group consisting of: a moving average, a weighted moving average, a moving range, a moving standard deviation, and a moving variance, each ordered by the magnitude of the difference between the best and worst group of process outcomes from the smallest difference to the largest difference or vise versa.

13. The system of claim 9 wherein the animation comprises displaying frames in a manner selected from the group consisting of: a moving average, a weighted moving average, a moving range, a moving standard deviation, and a moving variance, each ordered by the difference between the maximum and minimum of a selected group of process components or operations from the smallest difference to the largest difference or vice versa.

14. The system of claim 9 wherein the animation comprises displaying frames in a manner selected from the group consisting of: a moving average, a weighted moving average, a moving range, a moving standard deviation, and a moving variance, each ordered by the date of manufacture, batch number or lot number.

15. A method for producing a visual process signature representing a manufacturing process, the method comprising the steps of:
providing a data source holding groups of data, each group representing process parameters of a manufacturing process;
selecting at least three characteristics of the groups of data;
generating a plurality of display frames, where each display frame represents the selected characteristics of a particular group of data in a three-dimensional representation; and
visually displaying the generated display frames in a sequential fashion to present an animated visual process signature to a user.

16. The method of claim 15 where each frame comprises first, second and third axes, the method further comprising the steps of:
displaying data from the data source in each frame so that the displayed position on the first axis is derived from the magnitude of the corresponding parameter;
displaying the data from the data source so that the data's position on the second axis comprises a name for the parameter; and displaying the data from the data source so that the data's position on the third axis comprises a group statistic of the selected data in the corresponding group of data.

17. The method of claim 16 wherein the group statistic is selected from the group consisting of: group mean, group range, group standard deviation, group relative standard deviation; group variance; group maximum; group minimum; group principle component regression loading; group correlation coefficient; and group P value.

18. The method of claim 16 wherein the visually displaying further comprises:
   selecting one of the parameter names as represented on the second axis;
   ordering the frames from highest to lowest according to the value of the data corresponding to the selected parameter name on the first axis; and
   displaying the sequence in a sequential fashion determined from the ordering step.

19. The method of claim 18 wherein the selected parameter is indicated using a color distinct from the non-selected parameters during the displaying step.

20. The method of claim 16 wherein the visually displaying further comprises:
   ordering the frames on a data group-by-data group basis according to a relative time at which the data in each of the data groups was gathered; and
   displaying the sequence in a sequential fashion determined from the ordering step.

21. The method of claim 16 wherein the visually displaying further comprises:
   selecting one of the parameter names as represented on the second axis;
   determining a group having a best performance for the selected parameter;
   determining a group having a worst performance for the selected parameter;
   ordering the frames from highest to lowest according to a difference between the best and word performance of the selected process parameter; and
   displaying the sequence in a sequential fashion determined from the ordering step.

22. The method of claim 15 wherein the displaying is performed on a two-dimensional display, the visual display indicating directionality and extent of the characteristics of the selected process components in relation to the selected characteristics of the product produced.

23. The method of claim 15 wherein the groups of data correspond to data associated with groups of production batches within the manufacturing process.

* * * * *